Dec. 17, 1957 T. M. JABLON 2,816,381
SLIDE MOUNTINGS
Filed May 10, 1956 3 Sheets-Sheet 1
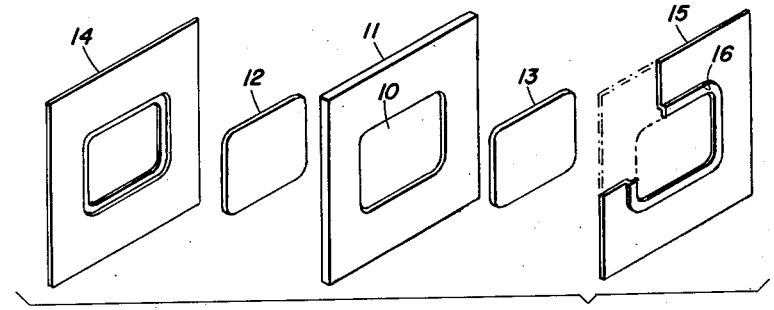
FIG. 1.
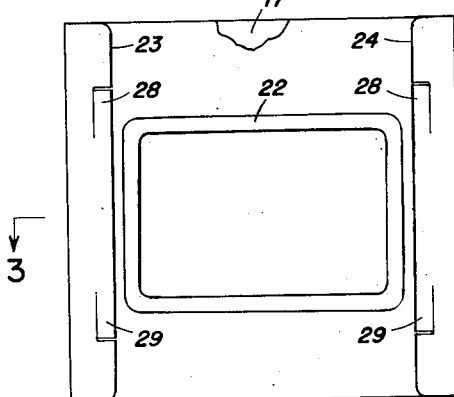
FIG. 2.
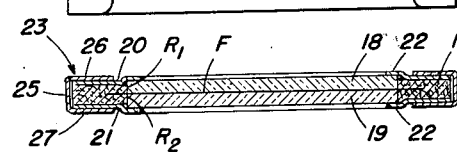
FIG. 3.
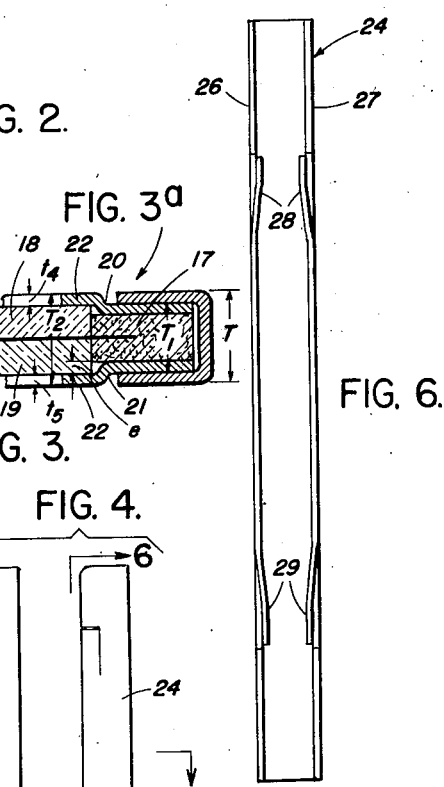
FIG. 3a.
FIG. 6.
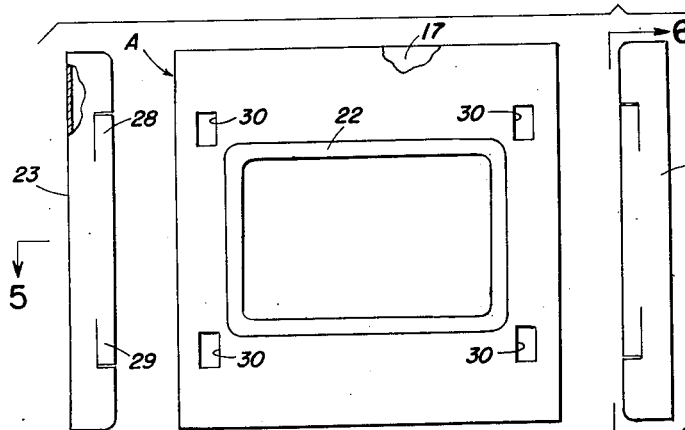
FIG. 4.
FIG. 5.
INVENTOR.
Theodore M. Jablon Dec. 17, 1957 T. M. JABLON 2,816,381
SLIDE MOUNTINGS
Filed May 10, 1956 3 Sheets-Sheet 2

INVENTOR
Theodore M. Jablon

Dec. 17, 1957 T. M. JABLON 2,816,381
SLIDE MOUNTINGS
Filed May 10, 1956 3 Sheets-Sheet 3

INVENTOR.
Theodore M Jablon

United States Patent Office 2,816,381
Patented Dec. 17, 1957

2,816,381

SLIDE MOUNTINGS

Theodore M. Jablon, Stamford, Conn.

Application May 10, 1956, Serial No. 586,341

4 Claims. (Cl. 40—152)

This invention relates to mountings for film transparencies or slides to be used in still projectors or viewers.

Such transparencies, as exemplified by the well known 35 mm. color transparencies, are usually obtained ready mounted in a light and thin card board frame herein termed the primary frame, capable as such to be used directly in the projector. In such a primary frame the film is unprotected against damage or touch, and with it one may also experience the familiar buckling or snapping out of focus of the film due to temperature changes or otherwise.

If protection is desired of the film against damage as well as against buckling, such transparencies require to be separated from the primary frame for re-mounting between protective transparent plates or glass plates in order to have the film confined and flat between the plates.

More particularly, this invention is concerned with improvements in the kind of protective slide mounting that is shown in my Patent No. 2,496,008. The mounting disclosed in that patent provides flat confinement of the film directly between protective glass plates applied to the primary frame without disturbing the film therein, that is without necessitating the removal therefrom. This is accomplished by seating a glass plate directly into each of the shallow recesses that is formed by each face of the film with the associated portion of the primary frame.

For retaining each glass plate thus seated upon the primary frame the patented mounting discloses a pair of auxiliary frames or cover frames having a picture opening slightly smaller than the glass plate, each cover frame in the patent being adherable to a respective face of the primary frame. The glass plate usually has a practical thickness somewhat greater than the depth of the shallow recesses of the primary frame, hence the cover frames as disclosed in the patent have a recess running the edge of the picture opening.

It is among the objects to provide a slide mounting which, while embodying the main features of the patented mounting, presents a glass-protected slide of minimum thickness, is convenient to assemble and to disassemble, is re-usable, and is very durable, as well as pleasing in appearance, and which consists of component parts that are highly compact, individually smooth and easily and compactly packageable, and which parts are economically producible by simple stamping and forming operations and with a minimum of waste material.

Another object is to provide a slide mounting with its glass weight significantly reduced, yet highly resistant to glass breakage, combined with such overall compactness and features of configuration as to readily lend itself advantageously for use in magazine type slide projectors.

These objects are attainable by assembling the primary frame with the glass plates in the manner above outlined, and applying the cover frames to constitute what is herein termed the frame assembly, and then applying closure members to at least one pair of opposed edge portions of this frame assembly. More specifically, these closure members, herein also termed clip members or clips, are groove-shaped or channel-shaped and have flat portions or flats detachably securable to respective portions of the cover frames. Each of the cover frames consists of a stamping of a suitable material for instance aluminum, formed with an offset portion to constitute a recess along the edge of the picture opening for accommodating excess thickness of the glass plates seated in the primary frame.

This recess on the cover frame appears outwardly as a slightly raised flat ledge surrounding the film picture, and extending substantially in an identical plane or flush with the flats of the closure members. The total effective thickness of the slide is thus minimized in that it represents the sum total or combined thicknesses of the film, of the two glass plates, plus the thickness or gauge of the sheet material from which the two cover frames are stamped. In other words, the application of the closure members adds nothing to the total thickness as above defined.

In one embodiment, the securing means for the clips or closure members comprise resiliently yieldable tongue portions struck from the flats of the closure members, the tongues engaging or catching in corresponding openings provided in the cover frames.

According to a specific feature, each channel-shaped closure member has a pair of tongues extending longitudinally of the channel shape and in opposite directions to one another, thus constituting a positive interlock as between the closure members and the associated portions of the cover frames.

In another embodiment, the securing means for the closure members comprise indentations in the flats of the closure members, fixing the position of the parts with respect to one another while maintaining detachability.

According to one feature, the indentations are effected in situ, that is after the parts have been assembled.

The invention possesses other objects and features of advantage, some of which with the foregoing will be set forth in the following description. In the following description and in the claims, parts will be identified by specific names for convenience. In the accompanying drawings there has been illustrated the best embodiment of the invention known to me, but such embodiment is to be regarded as typical only of many possible embodiments, and the invention is not to be limited thereto.

Fig. 1 is an exploded perspective view of the frame assembly per se.

Fig. 2 is a face view of one embodiment of the glass-protected slide, in which the edge closure members have tongue portions interlocking with the cover frames.

Fig. 3 is a cross-section of the slide taken on line 3—3 of Fig. 2.

Fig. 3ª is an enlarged detail view of the end portion of Fig. 3, more clearly showing the sum total of the component thicknesses of the assembled slide mounting.

Fig. 4 is a face view of the slide corresponding to that of Fig. 3, although exploded with respect to the closure members.

Fig. 5 is a cross-section of the component parts of Fig. 4, taken on line 5—5 thereof.

Fig. 6 is a side view enlarged of one of the closure members, taken on line 6—6 of Fig. 5.

Figure 7:
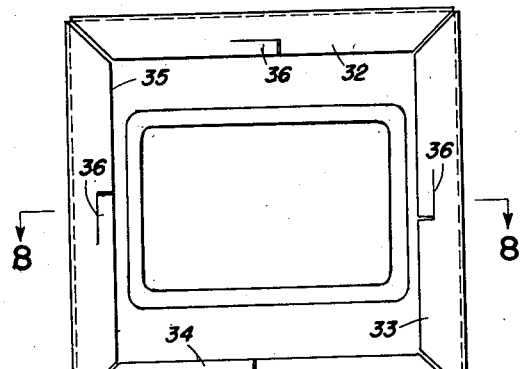

Fig. 7 is a face view of another embodiment of the glass-protected slide, providing two pairs of closure members engaging the frame assembly on all four sides.

Figure 8:
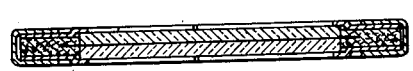

Fig. 8 is a cross-section taken on line 8—8 of Fig. 7.

Figure 9:
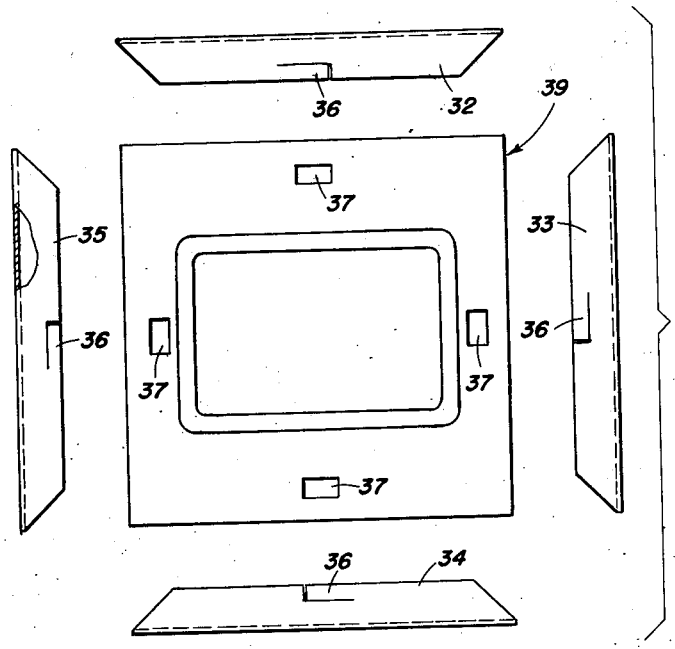

Fig. 9 is a view corresponding to that of Fig. 7, although exploded with respect to the closure members.

Figure 10:
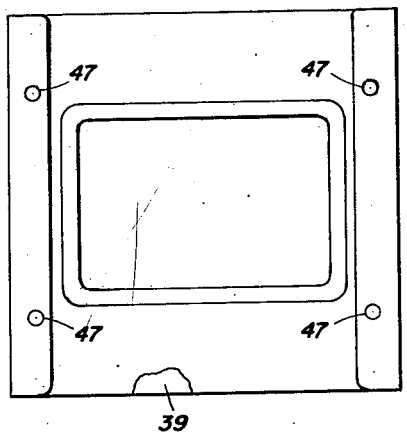

Fig. 10 is a face view of another embodiment in which the closure members are secured by means of indentations.

Figure 11:
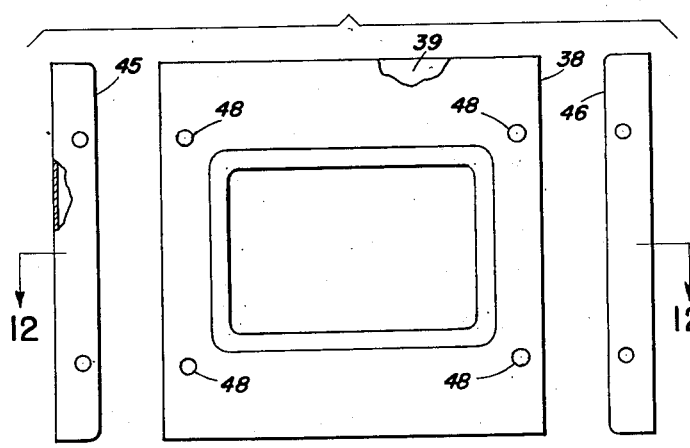

Fig. 11 is a view corresponding to that of Fig. 10, although exploded with respect to the closure members.

Figure 12:
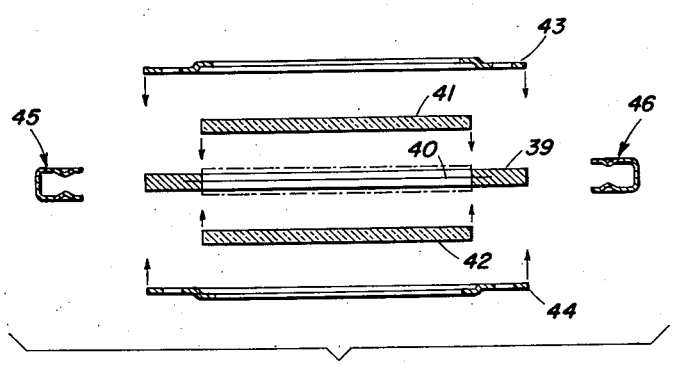

Fig. 12 is a cross-section taken on line 12—12 of

Fig. 11, although additionally exploded with respect to the frame assembly.

Figure 13:
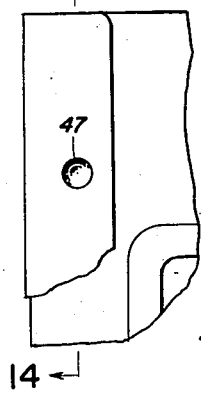

Fig. 13 is an enlarged detail view of the upper left-hand corner portion of the slide shown in Fig. 10, including an enlarged showing of the indentation.

Figure 14:
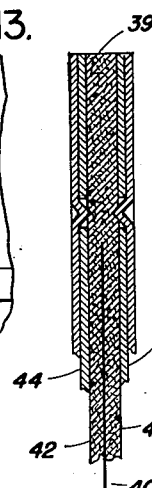

Fig. 14 is a vertical section taken on line 14—14 of Fig. 13, showing one manner of indentation.

Figure 15:
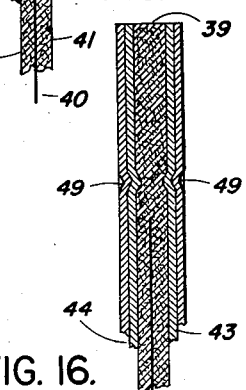

Fig. 15 is a vertical sectional view similar to that of Fig. 14, showing another manner of indentation.

Figure 16:
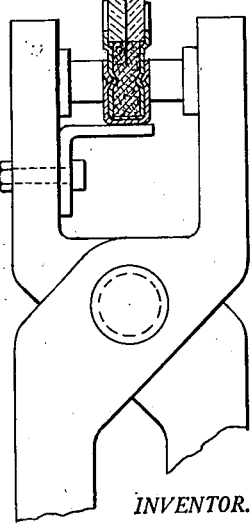

Fig. 16 illustrates the indentation operation.

The component elements of the frame assembly as illustrated in the perspective of Fig. 1, comprise the transparency or film 10 mounted in a primary frame 11, a pair of glass plates 12 and 13 seatable in the picture opening of the primary frame 11, and a pair of auxiliary or cover frames 14 and 15 for holding the plates seated upon the primary frame 11. Each cover frame is in the form of a stamping formed with a raised or offset portion 16 constituting a recess around the picture opening for accommodating excess thickness of the glass plates.

One embodiment as shown in Figures 2 to 6 comprises a frame assembly A substantially like that of Fig. 1, namely the assembly of a film-carrying primary frame 17, a film F, a pair of glass plates 18 and 19 seated in the respective shallow recesses $R_1$ and $R_2$ that are formed by each face of the film with the associated frame portion surrounding it, and a pair of cover frames 20 and 21 stamped of suitable sheet material such as aluminum. Each of these cover frames has a picture opening slightly smaller than the size of the respective glass plates and is formed with a recessed or offset portion 22 around the picture opening, to accommodate excess thickness of the glass plates therein.

In addition, the mounting comprises a pair of channel-shaped closure members 23 and 24 formed of suitable sheet material such as aluminum or thin steel. Each of the two closure members is U-shaped in cross-section and comprises a transverse body portion or back portion 25, and a pair of flat portions 26 and 27 herein briefly termed flats. Each of the flats has formed therein a pair of resiliently yieldable tongues 28 and 29 pointing in directions opposite to one another and towards the respective ends of the closure members. The tongues engage or catch in respective rectangular openings 30 provided in the respective cover frames 20 and 21. Removing or detaching the closure members 23 and 24 by disengaging the tongues, frees the frame assembly for exchanging the primary frame 11.

Referring more particularly to the enlarged detail Figure 3ª, it is noted that the total thickness T of this glass-protected mounting is represented substantially by the combination or sum of the component thicknesses of the frame assembly, namely the thickness $t_1$ of the film F, thickness $t_2$ of the one glass plate 18, thickness $t_3$ of the other glass plate 19, thickness $t_4$ of the sheet material of the one cover plate 20, and thickness $t^5$ of the other cover plate 21. Thus, as regards the effective total thickness, it is noted that the thicknesses of the flats 26 and 27 of the closure members cancel out, inasmuch as they occupy the space around the raised or offset portion 16 of the cover frames.

Another embodiment shown in Figures 7, 8, 9 comprises a frame assembly 31 substantially similar to the frame assembly A shown in Figures 2 to 6, together with an arrangement of two pairs of detachable, namely pair 32 and 34, and pair 33 and 35, which members surround the frame assembly in a manner similar to a picture frame. Each of these closure members is shown to be formed with a tongue 36 to engage or catch in a corresponding rectangular opening 37 provided in the respective cover frames.

Another embodiment shown in Figures 10 to 16 is similar to the Figure 2 to 6 embodiment except for the manner in which the closure members are secured to the frame assembly. This embodiment has a frame assembly 38 which comprises the primary frame 39 with film 40, glass plates 41 and 42 seatable upon each respective face of the film in the manner above set forth in connection with the other embodiments, and a pair of cover frames 43 and 44 for retaining the plates in their respective shallow recesses upon the primary frame 39.

This frame assembly is held together by means of a pair of channel-shaped closure members 45 and 46 held in place by means of indentations indicated at 47 upon each flat portion of each of the closure members 45 and 46. A pair of such indentations is shown to be impressed upon each flat of each closure member. According to Figures 10 to 14, the indentation 47 impressed into the closure member extends into the matching hole 48 provided in the respective cover frame. The indentation 47 is here shown to reach the material of the primary frame 39 and to make slight imprint or mark therein.

Fig. 17 illustrates an intermediate phase in the manipulation of the assembly of the parts, namely the phase that precedes the application of the closure members proper. This illustrates the manner in which the component parts of the frame assembly or sub-assembly S with its primary frame, its glass plates, and its cover frames, is conveniently alignable and readily held in such alignment preparatory to the application of the closure members to the frame assembly.

It will be understood that the scope of this invention is not limited to a specific shape or length of the closure members, nor is it limited to any specific position-securing means for these members, nor to the number of such members that may be applied to this assembly.

One aspect of importance of this invention is due to the fact that the frame assembly A of Fig. 5, because of its special configuration and compactness, is usable directly in existing feeder or carrier frames such as are contained in, and are an operating part of the exchangeable magazine boxes used in wellknown magazine type projectors. Such attachable magazine boxes contain a pre-arranged sequence of slides each of which is placed in its own feeder frame, and the feeder frames themselves are actuated sequentially incident to stepwise horizontal advancement of the box to carry each slide into the projector and again into the box. When a series of slides in the box has thus been projected, another magazine box may be substituted.

Indeed from the cross-sectional contour of this frame assembly A appearing in Fig. 3 and Fig. 5, it is observed that its marginal thickness $T_1$ consists merely of the thin primary frame 17 although shown as of exaggerated thickness, plus that of the two thin metal stampings that constitute the cover frames 20 and 21. The central portion of the frame assembly A is of a thickness $T_2$ and is greater than the thickness $T_1$ at the margin by the amount of the excess glass thickness $e$. Furthermore, if viewed facewise or frontwise, the frame assembly A is a square shape no larger than the dimensions of the primary frame 17 itself. Because of such contour characteristics, the frame assembly is accepted directly by, and is insertable in the special feeder frames of such magazine type slide projectors, as will presently be seen.

A magazine feeder frame such as herein contemplated, is in the form of a thin-metal stamping which is formed to comprise a body portion provided with a picture opening of such shape that the slide pictures may be disposed therein either vertically or horizontally. Along each of two opposed edges of this body portion there is provided an inwardly overhanging flange, the flanges thus pointing towards one another and spaced from the body portion to constitute therewith a pair of parallel grooves for the reception and retention therein of the slide. A transverse flange or narrow ledge may extend along a third edge of the body portion, to constitute with the retaining flanges a pocket for the frame assembly to be inserted therein.

As an aspect of this invention, the above defined contour of the frame assembly A will fit into such a feeder frame in such a manner that the smaller marginal thickness T of the assembly will occupy the groove portions of the feeder frame, whereas the greater thickness $T_2$ at the middle will come to lodge within the open areas of the feeder frame. In this way, the one raised portion at one side of the frame assembly A would come to lodge within the area of the picture opening aforementioned, whereas the opposite raised portion would come to lodge within the area between the slide-retaining flanges of the feeder frame. Therefore, the total thickness of the assembly as a whole inclusive of the feeder frame would not exceed the maximum thickness $T_2$ of the frame assembly A itself, even though glassplates of adequate and conventional thickness be employed.

Therefore, an aspect of importance of this invention lies in the fact that the frame assembly A offers relative glass weight reduction, yet high resistance to glass breakage, together with minimum total thickness and overall compactness, whereby it readily and advantageously lends itself for use in magazine type slide projectors in the manner above indicated.

What I claim is:

1. A glass plate protected film transparency in which a film-carrying primary frame forms a shallow recess with each respective face of the film, with a glass plate seated in each recess, a pair plate-retaining cover frames constitute with said primary frame and said glass plates a frame assembly, and holding means are provided for retaining the parts of the assembly with respect to one another; characterized thereby that said holding means comprise a pair of channel-shaped closure members detachably engaging over a pair of opposed edge portions of said frame assembly, such closure member U-shaped in cross-section being formed with flat shank portions extending over respective cover frames, and further characterized thereby that each closure member has securing means comprising a pair of flat tongues formed in and from one of the flat shank portions and extending in opposite directions towards the respective ends of said closure member, and that the associated cover frame has a pair of corresponding openings and is secured and locked in place by said tongues engaging in said openings.

2. A glass plate-protected film transparency according to claim 1 in which each said cover frame is formed with a raised offset edge portion constituting a marginal recess around the picture opening for accommodating excess thickness of the glass plates seated in the primary frame, so that the total thickness of the glass-protected transparency is substantially equal to the combined thicknesses of the film, of the glass plates, and of the sheet material constituting the cover frames, and said flat shank portions are disposed substantially in a plane with said raised portions of the respective cover frames.

3. A protective glass plate mounting applicable to a film transparency marginally held in a primary frame whereby each face of the film forms with its associated frame portion a shallow recess, a protective glass plate is seatable in each recess, a pair of plate-retaining cover frames are adapted to constitute with said primary frame and said glass plates a frame assembly, and holding means are adapted to retain the parts of the assembly with respect to one another; characterized thereby that said holding means comprise a pair of channel-shaped closure members adapted to detachably engage over a pair of opposed edge portions of said frame assembly, such closure member U-shaped in cross-section being formed with flat shank portions adapted to extend over respective cover frames, and further characterized thereby that each closure member has securing means comprising a pair of flat tongues formed in and from one of the flat shank portions and extending in opposite directions towards the respective ends of said closure member, and that the associated cover frame has a pair of corresponding openings and is adapted to be secured and locked in place by said tongues engaging in said openings.

4. A glass plate protected transparency according to claim 3, in which each cover frame is formed with a raised offset edge portion constituting a marginal recess around the picture opening adapted to accommodate excess thickness of the glass plates seated in the primary frame, so that the total thickness of the glass-protected transparency is substantially equal to the combined thickness of the film, of the glass plates, and of the sheet material constituting the cover frames, and said flat shank portions are adapted to be disposed substantially in a plane with said raised portions of the respective cover frames.

References Cited in the file of this patent

UNITED STATES PATENTS

| | | |
|---|---|---|
| 1,481,120 | Brombosz | Jan. 15, 1924 |
| 1,524,797 | Mayer | Feb. 3, 1925 |
| 1,754,851 | Dey | Apr. 15, 1930 |
| 2,403,491 | Bogia | July 9, 1946 |
| 2,490,058 | Jablon | Dec. 6, 1949 |
| 2,496,008 | Jablon | Jan. 31, 1950 |
| 2,639,531 | Engemann | May 26, 1953 |